United States Patent [19]

Kho

[11] Patent Number: 5,570,393
[45] Date of Patent: Oct. 29, 1996

[54] DIGITAL AUDIO SIGNAL DEMODULATOR

[75] Inventor: Tae H. Kho, Seoul, Rep. of Korea

[73] Assignee: Goldstar Co., Ltd., Youngdungpo-Gu, Seoul, Rep. of Korea

[21] Appl. No.: 366,154

[22] Filed: Dec. 29, 1994

[30] Foreign Application Priority Data

Dec. 31, 1993 [KR] Rep. of Korea .................. 93-32128

[51] Int. Cl.$^6$ ................................................. H04L 27/22
[52] U.S. Cl. .......................... 375/333; 375/361; 375/362
[58] Field of Search .................................. 375/329, 333, 375/359, 361, 362, 365, 364, 369, 370; 329/304, 345; 370/105.1; 371/49.3

[56] References Cited

U.S. PATENT DOCUMENTS

| | | | |
|---|---|---|---|
| 4,242,755 | 12/1980 | Gauzan | 375/361 |
| 4,592,072 | 5/1986 | Stewart | 375/333 |
| 5,040,195 | 8/1991 | Kosaka et al. | 375/365 |

Primary Examiner—Stephen Chin
Assistant Examiner—Don Vo
Attorney, Agent, or Firm—Keck, Mahin & Cate

[57] ABSTRACT

A digital audio signal demodulator which demodulates an input digital audio interface format signal inputted with asynchronous serial bits to a non-return to zero (NRZ) signal, corrects error per frame, and provides the error-corrected NRZ signal, being synchronized with a digital-to-analog conversion control signal. According to the demodulator, data in the digital audio interface format signal except a header region is demodulated in a demodulating section and the demodulated NRZ data is converted into parallel NRZ data by a serial-parallel conversion section. The even parity error of the parallel NRZ data is corrected in accordance with error check pulses from an error detecting and latch section, and the error-corrected parallel NRZ data is converted into serial data by a parallel-serial conversion section to be provided to a following digital-to-analog converter. A digital-to-analog conversion control signal is provided from a conversion control signal generating means, being synchronized with the digital audio interface format signal.

10 Claims, 4 Drawing Sheets

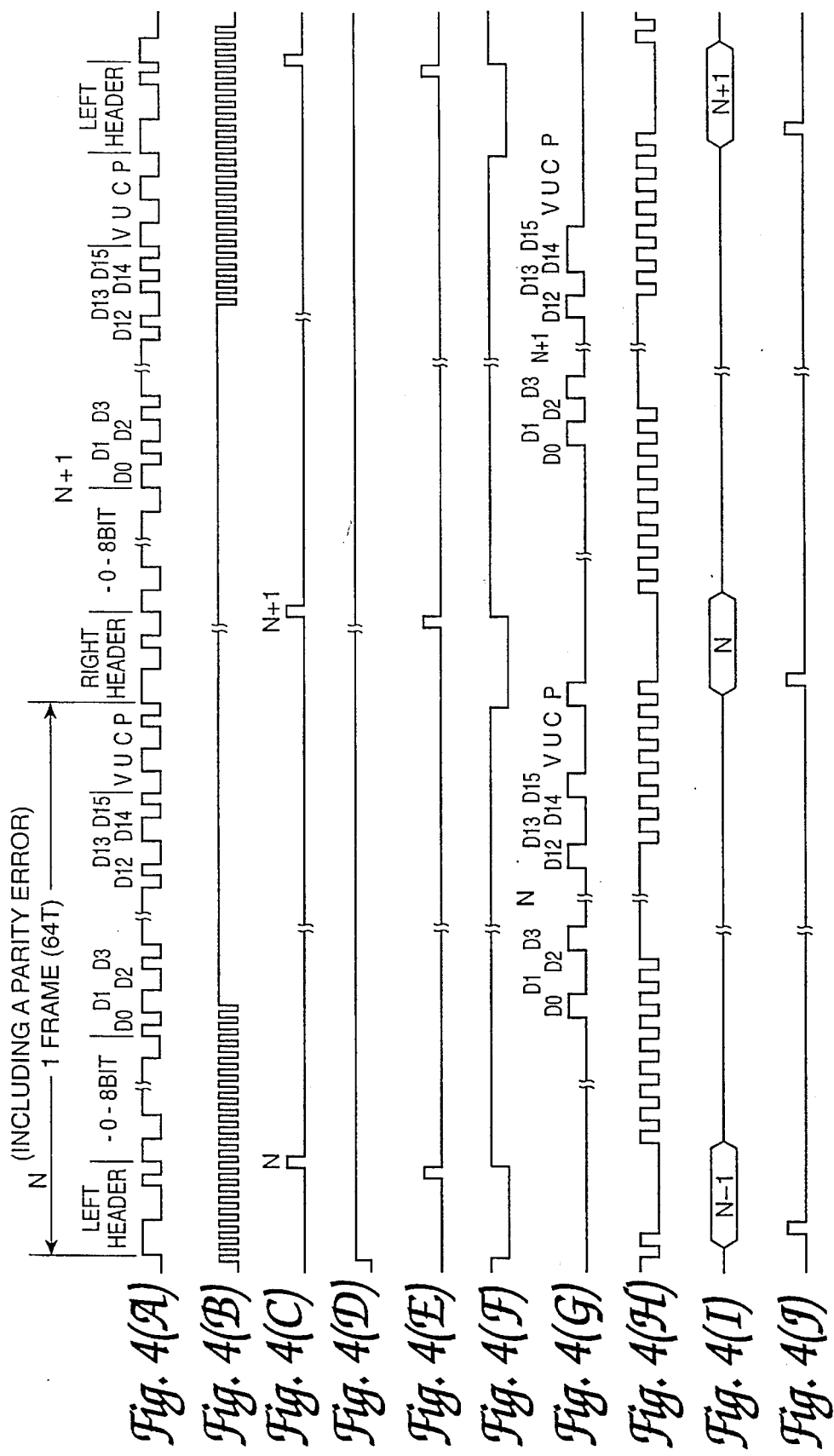

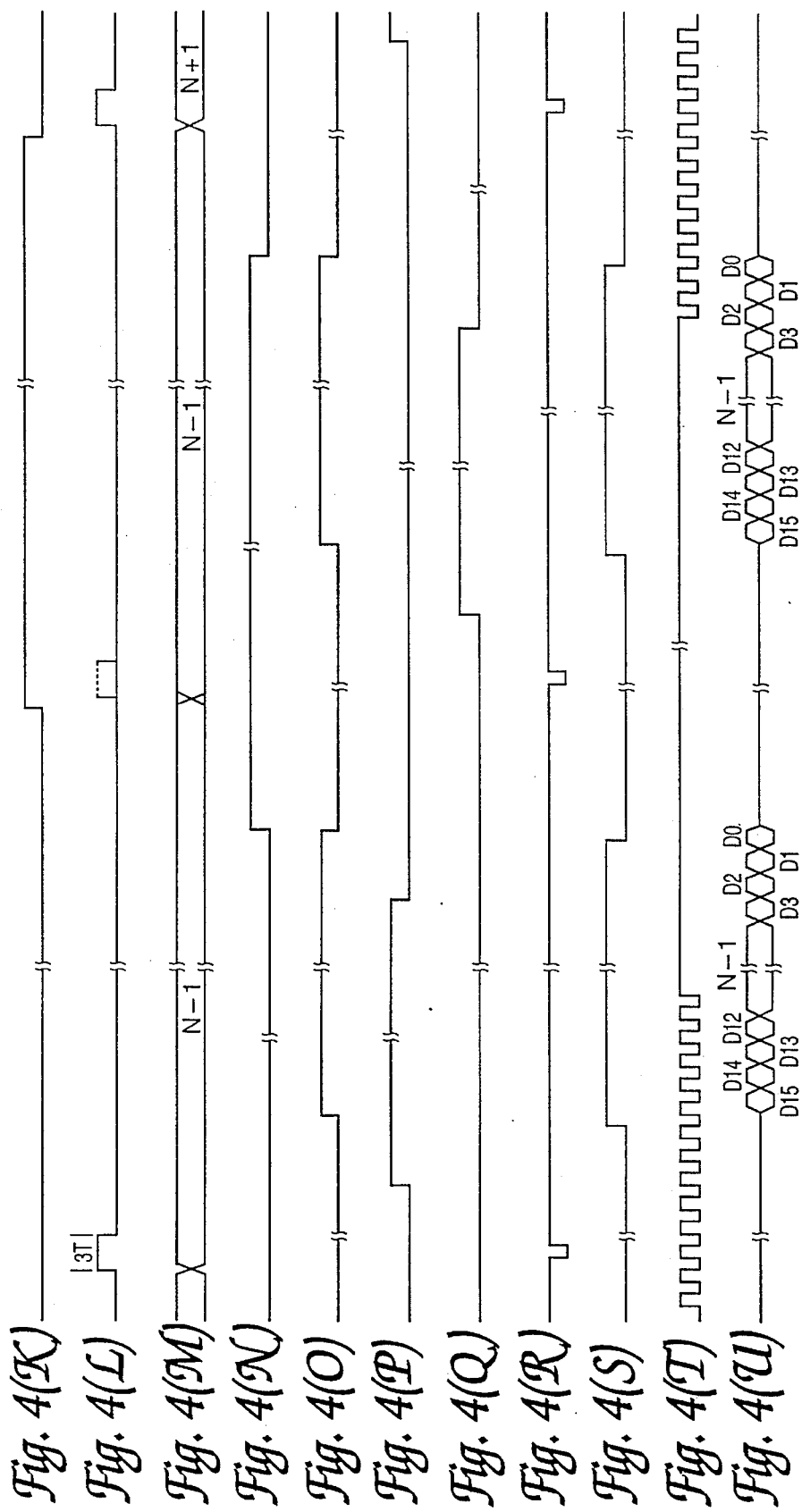

DIGITAL AUDIO SIGNAL DEMODULATOR

BACKGROUND OF THE INVENTION

1. Field of the Invention

The present invention relates to a demodulator of a digital audio signal, and more particularly to a digital audio signal demodulator which demodulates a digital audio interface format signal, being continually inputted with asynchronous serial bits, to a non-returnto zero (NRZ) signal, corrects error per frame with respect to the NRZ signal, and provides the error-corrected NRZ signal, being synchronized with a digital-to-analog conversion control signal.

2. Description of the Related Art

Generally, one frame of a digital audio interface format signal is composed of a header signal of 4 bits for discriminating left and right channel signals, a phase-modulated subcode of 8 bits, audio data of 16 bits, and specific codes of 4 bits. The digital audio interface format signal of 20 bits except the header has been phase-modulated.

Specifically, one frame of the digital audio interface format signal consists of 46T (wherein 2T is a one-bit time) with a sampling frequency of 5.6448 MHZ, and a signal transition always occurs within the one-bit time (=2T) in the 28-bit region of the digital audio interface format signal except the header region. The digital audio interface format signal utilizes a Bi-Phase-Mark type modulation. Each bit is determined to be "1" if a signal transition exists during the one-bit time (=2T), while "0" if not.

The digital audio interface format signal is mainly used for signal transmission between digital audio appliances, and has the advantage that it suffers almost no signal loss in comparison with analog audio signal transimission. Meanwhile, the digital audio interface format signal, due to the characteristics of its signal format, is capable of being demodulated even if its phase is inverted by 180°, and thereby it can be adopted to an infrared rays digital data transmitting/receiving system.

FIG. 2 is a block diagram of a prior art digital audio signal transmitting/receiving system.

According to the signal transmitting system of FIG. 2, an audio source i.e. converted into serial digital data by multiplexing left and right audio channel signals by means of an analog-to-digital converter 100, and the serial digital data is phase-modulated and formatted by a phase modulator and interface format generator 150. The formatted signal is pulse-position-modulated by a pulse position modulator (PPM) 200 and then provided to an infrared-emitting diode driving section 250, so that the modulated signal is transmitted in the air by an infrared rays transmitting section 300 wherein infrared-emitting diodes are arrayed.

Meanwhile, according to the signal receiving system of FIG. 2, the pulse-position-modulated digital audio interface format signal transmitted in the air is detected by an infrared rays receiving section 350, and then amplified by an amplifier 400 to compensate for the attenuation of the received signal. The pulse-position-modulated digital audio interface format signal is reproduced and restored to its original format by an interface format reproducing section 450. The restored digital audio interface format signal, which is composed of 28 bits except a header signal, is then demodulated to an NRZ signal, and only the audio data therein is outputted to a digital-to-analog converter 600.

Consequently, according to the prior art system, the control signal required to control the digital-to-analog converter 600 must be synchronized with the demodulated audio data in order that the digital-to-analog converter 600 reproduces the original audio source using the audio data and the control signal synchronized with the audio data.

SUMMARY OF THE INVENTION

It is an object of the present invention to provide a digital audio signal demodulator which can demodulate a digital audio interface format signal continually inputted with asynchronous serial bits to an NRZ signal, correct error in the unit of a frame with respect to the NRZ signal, and provide the error-corrected NRZ signal, being synchronized with a digital-to-analog conversion control signal.

In order to achieve the above abject, there is provided a digital audio signal demodulator comprising:

a system clock generating means for generating clock pulses synchronized with an input digital audio interface format signal and providing said clock pulses to said demodulator;

a header detecting means for detecting a header region of said digital audio interface format signal;

a lock detecting means for counting synchronizing clock pulses existing in header detection pulses from said header detecting means and providing a lock detection signal in the unit of a frame;

means for generating a synchronizing signal by detecting a start point of a subcode in said digital audio interface format signal;

means for demodulating data in said digital audio interface format signal except said header region;

a serial-parallel conversion means for converting serial non-returnto zero (NRZ) data provided from said demodulating means into parallel NRZ data;

an error detecting and latch means for detecting an even parity error of said parallel NRZ data from said serial-parallel conversion means using error check pulses, and latching said parallel NRZ data according to detected error data;

a conversion control signal generating means for providing a digital-to-analog conversion control signal synchronized with said digital audio interface format signal; and a parallel-serial conversion means for converting said parallel NRZ data from said error detecting and latch means into serial data, and providing said serial data to a following digital-to-analog converter.

These and other features and advantages of the present invention will be apparent to those skilled in the art from the following detailed description, taken together with the accompanying drawings, in which like reference numerals refer to like parts.

BRIEF DESCRIPTION OF THE DRAWINGS

FIG. 4 is a waveform diagram shown at various points in FIG. 3, explaining the operation of the demodulator according to the present invention.

DETAILED DESCRIPTION OF THE PREFERRED EMBODIMENT

The digital audio signal demodulator in accordance with the present invention is described below with reference to FIGS. 3 and 4.

Figure 3:
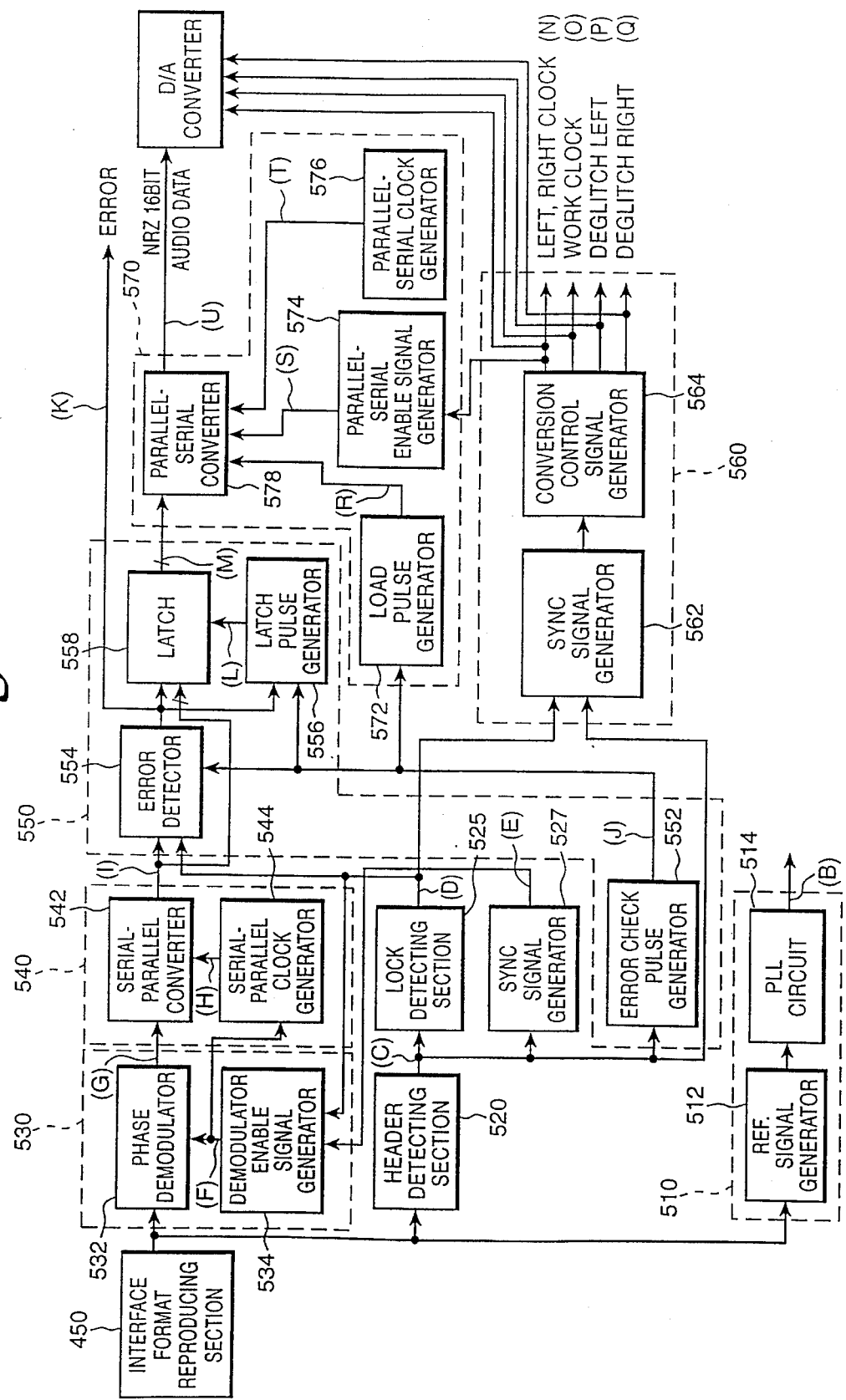
FIG. 3 is a block diagram of the digital audio signal demodulator according to the embodiment of the present invention.

Referring to FIG. 3, a system clock generating section 510 is provided with a reference signal generator 512 for generating a reference signal corresponding to a phase signal starting from a header start point in a digital audio interface format signal, and a phase locked loop (PLL) circuit 514 for generating sync clock pulses synchronized with the digital audio interface format signal in accordance with the phase signal outputted from the reference signal generator 512. A header detecting section 520 detects the header pattern of left and right channels and a block in the digital audio interface format signal, and outputs header detection pulses accordingly.

A lock detecting section 525 counts the sync clock pulses existing in the header detection pulses outputted from the header detecting section 520 and outputs a lock detection signal. A sync signal generator 527, which is connected to the output of the header detecting section 520, detects a starting point of a subcode in the digital audio interface format signal and outputs a corresponding sync signal.

A demodulating section 530 is provided with a demodulation-enable signal generator 534 which receives the respective output signals of the lock detecting section 525 and the sync signal generator 527 and outputs enable signal for the whole region of the digital audio interface format signal except the header region, and a phase demodulator 532 for phase-demodulating the digital audio interface format signal from an interface format reproducing section 450 during the period of the enable signal outputted from the demodulation-enable signal generator 534.

A serial-parallel conversion section 540 is provided with a serial-parallel clock generator 544 for generating 28 clock pulses per frame, being enabled by the enable signal from the modulation-enable signal generator 534, and a serial-parallel converter 542 including a serial-parallel shift register for converting the serial demodulated signal from the demodulating section 530 into parallel data, being matched with the clock pulses from the serial-parallel clock generator 544.

An error detecting and latch section 550 is provided with an error check pulse generator 552, connected to the output of the header detecting section 520, for generating error check pulses for checking an even parity error when the demodulated NRZ data is converted into a parallel data by the serial-parallel conversion section 540, an error detector 554 for detecting the even parity error of the parallel NRZ data outputted from the serial-parallel conversion section 540 in accordance with the error check pulses outputted from the error check pulse generator 552, a latch pulse generator 556 for generating latch pulses in accordance with the error check pulses outputted from the error check pulse generator 552, and a latch 558 for latching the parallel NRZ data in accordance with the latch pulses outputted from the latch pulse generator 556.

Meanwhile, a conversion control signal generating section 560 is provided with a sync signal generator 562 for generating a conversion sync signal for synchronizing four control signals supplied to a digital-to-analog converter 600 with the digital audio interface format signal in accordance with the respective output signals of the header detecting section 520 and the lock detecting section 525, and a conversion control signal generator 564 for generating and providing to the digital-to-analog converter 600 the four control signals of a left right clock signal N, a word clock signal O, a deglitch left signal p, and a deglitch right signal Q as shown in FIG. 4, being matched with the sync signal outputted from the sync signal generator 562.

A parallel-serial conversion section 570 is provided with a parallel-serial converter 578 including a parallel-serial shift register for converting the parallel data outputted from the error detecting and latch section 550 into serial data, a load pulse generator 572 for generating load pulses in accordance with the error check pulses outputted from the error check pulse generator 552 so that the parallel-serial converter 578 loads the latched data, a parallel-serial enable signal generator 574 for generating and providing an inhibit signal to the parallel-serial converter 578 in accordance with the control signals outputted from the conversion control signal generating section 560, and a parallel-serial clock generator 576 for generating and providing clock pulses to the parallel-serial converter 578 by dividing by 2 the clock pulses outputted from the system clock generating section 510.

The operation of the demodulator according to the present invention as constructed above will now be described with reference to FIGS. 3 and 4.

If the digital audio interface format signal A as shown in FIG. 4 outputted from the interface format reproducing section 450 is inputted to the system clock generator 510, the reference signal generator 512 in the system clock generating section 510 outputs the phase signal having a period of 8T to the PLL circuit 514, utilizing the characteristics that a transition always exists in the subcode for every 4-bit time (=8T) from the start point of the digital audio interface format signal. Accordingly, the PLL circuit 514 outputs the clock pulses B as shown in FIG. 4 as a system clock of the demodulator.

As the same time, the header detecting section 520 detects a left channel header pattern (11100010), a right channel header pattern (11100100), or a block header pattern (11101000) from the digital audio interface format signal utilizing the clock pulses (5.6448 MHz), and provides the header detection pulses C as shown in FIG. 4 to the lock detecting section 525, the sync signal generator 527, and the error check pulse generator 552, respectively.

The lock detecting section 525 discriminates whether the PLL circuit 514 is locked or unlocked. Specifically, the lock detecting section 525 counts the period from the generation of Nth header detection pulse to the generation of (N+1)-th header detection pulse with the clock pulses B, utilizing the characteristics that 64 clock pulses exist between each header detection pulse C as shown in FIG. 4 outputted from the header detecting section 520. During counting operation, the lock detecting section 525 determines the PLL circuit 514 is in a lock state if the counted value comes to 64, and determines the PLL circuit 514 is in an Unlock state if not, so that the lock detecting section 525 outputs a lock detection pulse D as shown in FIG. 4 to the error detecting and latch section 550 and the conversion control signal generating section 560.

Meanwhile, the sync signal generator 527 outputs a sync signal E as shown in FIG. 4, which is for identifying the start point of the subcode in the digital audio interface format signal A. The sync signal E is the same as the header detection pulse C which is delayed for a period of 63 clock pulses B.

The demodulation-enable signal generator 534 in the demodulating section 530, which receives the respective output signals of the lock detecting section 525 and the sync signal generator 527, outputs to the phase demodulator 532 an enable signal F as shown in FIG. 4 which corresponds to the period of 28 bits of the digital audio interface format signal A except the header region. The demodulation-enable signal F becomes 'high' for a period of 56T, while becomes 'low' for a period of 8T, utilizing the sync signal E on condition that the PLL circuit 514 is locked.

The phase demodulator 532 in the demodulating section 530 demodulates the phase-modulated data of 28 bits in the digital audio interface format signal to the NRZ data while the demodulation-enable signal F is in a 'high' state.

Specifically, the phase demodulator 532 detects the digital audio interface format signal fox a one-bit time (=2T) utilizing the clock pulses B of 5.6448 MHz and the demodulation-enable signal F. If the detected value is "1,1" OR "0,0" the phase demodulator 532 recognizes it as "0" while if the detected value is "1,0" or "0,1" the phase demodulator 532 recognizes it as "1" thereby outputting the NRZ data G accordingly.

In order that the phase demodulator 532 recognizes whether the input data is "0" or "1" the phase-modulated data must be detected for a period of 2 clock pulses B, and thus the NRZ data is always outputted, being delayed for a period of 2 clock pulses with respect to the input phase-modulated data.

The NRZ data outputted from the phase modulator 532 is provided to the serial-parallel converter 542 in the serial-parallel conversion section 540 in order to check the even parity error. The serial-parallel converter (i.e., shift register) shifts and converts the NRZ data into parallel data I as shown in FIG. 4 in accordance with the serial-parallel conversion clock pulses (2.8224 MHz) H outputted from the serial-parallel clock generator 544, and outputs the parallel data to the error detector 554 in the error detecting and latch section 550. 28 serial-parallel conversion clock pulses are provided for one frame of the NRZ data.

When the NRZ data G provided to the error detector 554 is shifted and converted into the parallel NRZ data I, the error check pulse generator 552 generates and outputs the error check pulses J as shown in FIG. 4 to the error detector 554 for checking the even parity error of the parallel NRZ data. The error check pulse J is the same as the header detection pulse C which is delayed for a period of 58 clock pulses B. The error detector 554 outputs an error detection signal K as shown in FIG. 4 so that the error detection signal comes to 'high' when the error is detected, while it comes to 'low' when the error is not detected. If the PLL circuit 514 is unlocked, this is also considered as the error, and the error detection signal comes to 'high'. If the parity error is not detected by the error detector 554 as a result of checking the even parity error converted into the parallel data I, the latch signal L as shown in FIG. 4 outputted from the latch pulse generator 556 comes to 'high' for a period of 3T, while comes to 'low' if the parity error is detected. The latch 558 receives the latch signal L, latches the parallel data I for a period of 3T in which no parity error is detected, and outputs error-corrected parallel data M as shown in FIG. 4 to the parallel-serial converter 578 in the parallel-serial conversion section 570.

Figure 1:
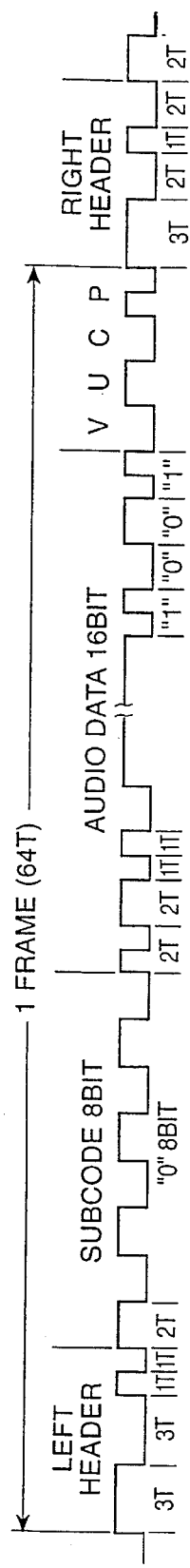
FIG. 1 is a view showing a digital audio interface format signal for digitally transmitting an audio source.
Figure 2:
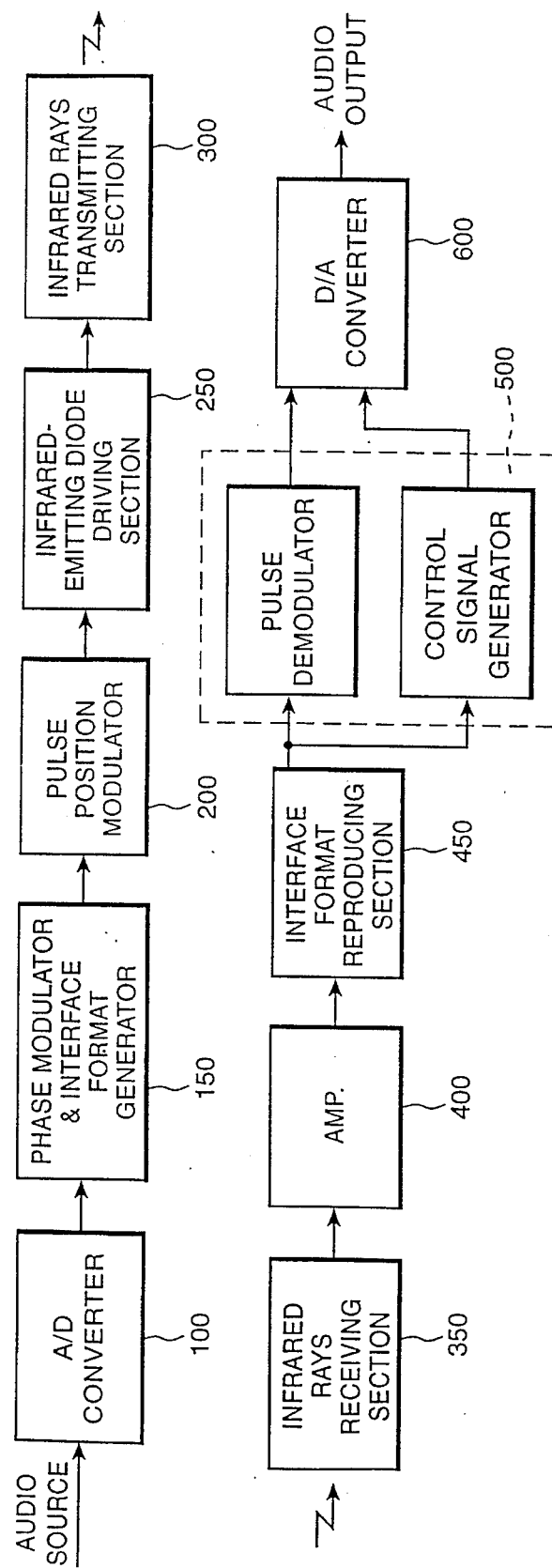
FIG. 2 is a block diagram of the prior art digital audio signal transmitting/receiving system.

Meanwhile, the conversion control signal generator 564 in the conversion control signal generating section 560 generates the control signals N (left/right clock), O (word clock), P (deglitch left), and Q (deglitch right) as shown in FIG. 4 to control the operation of the digital-to-analog converter 600 as shown in FIG. 2. The left/right clock signal N is provided by dividing the word clock signal O by 2. If the left/right clock signal N is 'low' and the word clock O is 'high', right channel audio data U among the latched data M is outputted through the parallel-serial converter 578 as shown in FIG. 4. If the left/right clock signal N is 'high' and the word clock signal is 'high', left channel audio data U among the latched data M is outputted through the parallel-serial converter 578 as shown in FIG. 4.

As described above, in order to output the left and right channel audio data in order in accordance with the left/right clock signal N, the control signals N, O, P, and Q outputted from the conversion control signal generator 564 should be matched with the sync signal outputted from the sync signal generator 562 so as to be synchronized with the digital audio interface format signal A.

The load pulse generator 572 inverts the error check pulses J as shown in FIG. 4 outputted from the error check pulse generator 552, and delays the inverted pulses for a period of 2 clock pulses B outputted from the system clock generating section 510 to provide the load pulses R as shown in FIG. 4. The parallel-serial converter (i.e., shift register) 578 loads the latched data M in accordance with the load pulses R. The parallel-serial enable signal generator 574 outputs an enable signal, i.e., an inhibit signal S as shown in FIG. 4 to the parallel-serial converter 578 in accordance with the left/right clock signal N outputted from the conversion control signal generator 564. The inhibit signal is outputted prior to the word clock signal O by a period of one clock pulse.

Meanwhile, the shift clock pulses T as shown in FIG. 4, which are outputted from the parallel-serial clock generator 576 to the parallel-serial converter 578, is obtained by dividing the clock pulses B by 2. Accordingly, the parallel-serial converter 578 synchronizes the latched data, being loaded on the parallel-serial converter 578 in accordance with the load pulses R, with the shift pulses T for a period of the inhibit signal S, so that the parallel-serial converter 578 outputs the demodulated left and right channel audio data U as shown in FIG. 4.

From the foregoing, the demodulator according to the present invention can reproduces the original audio source without the necessity of synchronizing the control signals with the demodulated audio signal for the digital-to-analog conversion of the demodulated audio signal by demodulating the digital audio interface format signal continually inputted with asynchronous serial bits to the NRZ signal, correcting the error in the unit of a frame, and then outputting the error-corrected NRZ signal, being synchronized with the digital-to-analog conversion control signal.

Whereas the present invention has been described in particular relation to the drawings attached hereto, it should be understood that other and further modifications, apart from those shown or suggested herein, may be made within the spirit and scope of this invention.

What is claimed is:

1. A digital audio signal demodulator comprising:
   a system clock generating means for generating clock pulses synchronized with an input digital audio interface format signal;
   a header detecting means for detecting a header region of said digital audio interface format signal;
   a lock detecting means for counting synchronizing clock pulses existing in the header detection pulses from said header detecting means and providing a lock detection signal in the unit of a frame;
   means for generating a synchronizing signal by detecting a start point of a subcode in said digital audio interface format signal;

means for demodulating data in said digital audio interface format signal except said header region in accordance with said synchronizing signal from said synchronizing signal generating means and said lock detection signal from said lock detecting means;

a serial-parallel conversion means for converting serial non-returnto zero (NRZ) data provided from said demodulating means into parallel NRZ data;

an error detecting and latch means for detecting an even parity error of said parallel NRZ data from said serial-parallel conversion means using error check pulses generated by the error detecting and latch means, and latching said parallel NRZ data according to detected error data;

a conversion control signal generating means for providing a digital-to-analog conversion control signal synchronized with said digital audio interface format signal;

a parallel-serial conversion means for converting said parallel NRZ data from said error detecting and latch means into serial data; and a digital-to-analog converter for receiving a digital-to-analog conversion control signal synchronized with said digital audio interface format signal from the conversion control signal generating means and for receiving said serial data converted by the parallel-serial conversion means.

2. A digital audio signal demodulator as claimed in claim 1, wherein said system clock generating means comprises:

a reference signal generator for generating a reference signal corresponding to a phase signal starting from a header start point in said digital audio interface format signal; and a phase locked loop circuit for generating clock pulses synchronized with said digital audio interface format signal in accordance with said phase signal from said reference signal generator.

3. A digital audio signal demodulator as claimed in claim 1, wherein said demodulating means comprises:

a demodulation-enable signal generator for generating an enable signal for a whole region of said digital audio interface format signal except said header region in accordance with the respective output signals of said lock detecting section and said synchronizing signal generating means; and a phase demodulator for phase-demodulating said digital audio interface format signal during a period of said enable signal from said demodulation-enable signal-generator.

4. A digital audio signal demodulator as claimed in claim 1, wherein said serial-parallel conversion means comprises:

a serial-parallel clock generator for generating conversion clock pulses for a period of one frame of said digital audio interface format signal; and a serial-parallel converter for converting said serial NRZ data from said demodulating means into said parallel NRZ data utilizing said conversion clock pulses from said serial-parallel clock generator.

5. A digital audio signal demodulator as claimed in claim 4, wherein said serial-parallel converter is a serial-parallel shift register for shifting said serial NRZ data to provide said parallel NRZ data.

6. A digital audio signal demodulator as claimed in claim 1, wherein said error detecting and latch means comprises:

an error check pules generator for generating error check pulses for checking said even parity error when said demodulated serial NRZ data is converted into said paralled NRZ data by said serial-parallel conversion means;

an error detector for detecting said even parity error of said parallel NRZ data from said serial-parallel conversion means in accordance with said error check pulses from said error check pulse generator;

a latch pulse generator for generating latch pulses in accordance with said error check pulses from said error check pulse generator; and a latch for latching said parallel NRZ data in accordance with said latch pulses from said latch pulse generator for error correction.

7. A digital audio signal demodulator as claimed in claim 6, wherein said error check pulses from said error check pulse generator are provided by delaying said header detection pulses from said header detecting means by 58 clock pulses from said system clock generating means.

8. A digital audio signal demodulator as claimed in claim 1, wherein said conversion control signal generating means comprises:

a synchronizing signal generator for generating a conversion synchronizing signal for synchronizing control signals provided to said digital-to-analog converter with said digital audio interface format signal in accordance with the respective output signals of said header detecting means and said lock detecting means; and a conversion control signal generator for generating and providing said control signals to said digital-to-analog converter, said control signals being matched with said conversion synchronizing signal from said synchronizing signal generator.

9. A digital audio signal demodulator as claimed in claim 1, wherein said parallel-serial conversion means comprises:

a parallel-serial converter for converting said parallel NRZ data from said error detecting and latch means into said serial data;

a load pulse generator for generating load pulses in accordance with said error check pulses from said error detecting and latch means so that said parallel-serial converter loads said parallel NRZ data from said error detecting and latch means;

a parallel-serial enable signal generator for generating and providing an inhibit signal to said parallel-serial converter in accordance with said control signals from said conversion control signal generating means; and a parallel-serial clock generator for generating and providing conversion clock pulses to said parallel-serial converter by dividing said clock pulses from said system clock generating means.

10. A digital audio signal demodulator as claimed in claim 9, wherein said conversion clock pulses from said parallel-serial clock generator are provided by dividing said clock pulses from said system clock generating means by 2.

* * * * *